(12) United States Patent
Abedini et al.

(10) Patent No.: US 12,068,795 B2
(45) Date of Patent: Aug. 20, 2024

(54) EXCESSIVE INTERFERENCE INDICATION

(71) Applicant: QUALCOMM Incorporated, San Diego, CA (US)

(72) Inventors: Navid Abedini, Basking Ridge, NJ (US); Igor Gutman, Hod HaSharon (IL); Peter Gaal, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/518,468

(22) Filed: Nov. 3, 2021

(65) Prior Publication Data

US 2023/0136719 A1     May 4, 2023

(51) Int. Cl.
*H04B 1/00* (2006.01)
*H04B 1/40* (2015.01)
*H04B 17/23* (2015.01)

(52) U.S. Cl.
CPC .............. *H04B 17/23* (2015.01); *H04B 1/40* (2013.01)

(58) Field of Classification Search
CPC . H04B 17/23; H04B 1/06; H04B 1/38; H04B 1/40; H04B 1/10; H04B 1/1036; H04B 1/109; H04B 1/126; H04M 2001/1045
See application file for complete search history.

(56) References Cited

U.S. PATENT DOCUMENTS

| | | | |
|---|---|---|---|
| 8,417,252 B2* | 4/2013 | Palanki | H04J 11/0053 370/328 |
| 10,281,556 B2* | 5/2019 | Mahmood | H04W 52/243 |
| 11,444,744 B2* | 9/2022 | Park | H04L 5/14 |
| 11,510,080 B2* | 11/2022 | Onggosanusi | H04W 72/23 |
| 2009/0046625 A1* | 2/2009 | Diener | H04L 1/0001 370/319 |
| 2009/0104887 A1* | 4/2009 | Ford | H04B 1/30 455/323 |
| 2011/0065408 A1* | 3/2011 | Kenington | H04B 1/1036 455/303 |
| 2018/0248640 A1* | 8/2018 | Wei | H04W 48/16 |
| 2019/0090279 A1* | 3/2019 | Sun | H04W 28/26 |
| 2020/0236725 A1* | 7/2020 | Martin | H04L 5/0033 |
| 2022/0190393 A1* | 6/2022 | Yang | H01M 50/284 |
| 2022/0190939 A1 | 6/2022 | Zhang et al. | |

* cited by examiner

*Primary Examiner* — Tuan Pham
(74) *Attorney, Agent, or Firm* — Arun Swain

(57) ABSTRACT

A network device is provided with excessive interference mitigation. In one implementation, the network device transmits a notification of the excessive interference to a network entity. In another implementation, the network device changes a receive beam or begins to acquire a new cell in response to a detection of the excessive interference. In yet another implementation, the network device alerts a user in response to a detection of the excessive interference.

29 Claims, 5 Drawing Sheets

EXCESSIVE INTERFERENCE INDICATION

TECHNICAL FIELD

This application relates to wireless communication systems, and more particularly to a wireless communication system with an excessive interference indication.

INTRODUCTION

To meet the growing demands for expanded mobile broadband connectivity, wireless communication technologies have advanced from the long-term evolution (LTE) technology to a next generation new radio (NR) technology, which may also be referred to as $5^{th}$ Generation (5G). For example, NR is designed to provide a lower latency, a higher bandwidth/throughput, and a higher reliability than LTE. NR may operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands.

The proliferation of network devices in modern broadband systems such as 5G increases the likelihood of excessive interference. For example, a victim user equipment (UE) may be relatively close to an aggressor network device (e.g., another UE, a repeater, an integrated access and backhaul mobile termination (IAB-MT), a distributed unit (DU) or a transmission/reception point (TRP)). Due to the proximity to the aggressor network device, the victim UE may be exposed to a relatively strong incoming signal when the aggressor network device transmits. This relatively strong incoming signal may cause malfunctions in the UE's receiver such as low-noise amplifier compression and/or saturation. In addition, the relatively strong incoming signal may even lead to permanent failure of receiver components, particularly if the exposure to the relatively strong incoming signal is prolonged.

SUMMARY

The following summarizes some aspects of the present disclosure to provide a basic understanding of the discussed technology. Its sole purpose is to present some concepts of one or more aspects of the disclosure in summary form as a prelude to the more detailed description that is presented later.

In one aspect of the disclosure, a network device is provided that includes: a transceiver having an interference detector configured to detect an excessive interference from a received RF signal; and a processor configured to command the transceiver to transmit a notification of the excessive interference to a network entity in response to a detection by the interference detector of the excessive interference from the received RF signal.

In an additional aspect of the disclosure, a network device is provided that includes: a transceiver including an interference detector configured to detect an excessive interference from a RF signal received over a first receive antenna beam; and a processor configured to command the transceiver to receive over a second receive antenna beam and/or declare a radio link failure responsive to a detection by the interference detector of the excessive interference from the RF signal received over the first receive antenna beam.

In another aspect of the disclosure a network device is provided that includes: a transceiver having an interference detector configured to detect an excessive interference from a received RF signal; a user interface; and a processor configured to command the user interface to provide an alert of the detection by the interference detector of the excessive interference from the received RF signal.

In yet another aspect of the disclosure, a method is provided that includes: comparing an interference produced in a receiver of a first network device from a received RF signal to a threshold; detecting an excessive interference from the received RF signal responsive to the interference exceeding the threshold; and transmitting a notification of the excessive interference from the network device to a network entity in a network including the network device.

Other aspects, features, and embodiments of the disclosure will become apparent to those of ordinary skill in the art upon reviewing the following description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

To process incoming RF signals, network devices in a wireless communication system include a receiver having an RF frontend with various components such as a low-noise amplifier (LNA), filters, and so on. The RF frontend processes a received RF signal through a frequency down-converting translation stage (e.g., one of more mixers) to provide an analog baseband signal. An RF chain begins with the RF frontend and terminates in an analog-to-digital converter (ADC) for converting the analog baseband signal to a digital baseband signal. The receiver should have a linear behavior with regard to converting the received RF signal into the corresponding digital baseband signal. But such linear behavior requires the incoming RF signal to be constrained to a power range that is neither too weak nor too powerful. Should the incoming RF signal be too powerful, the receiver no longer has a linear behavior.

Figure 1:
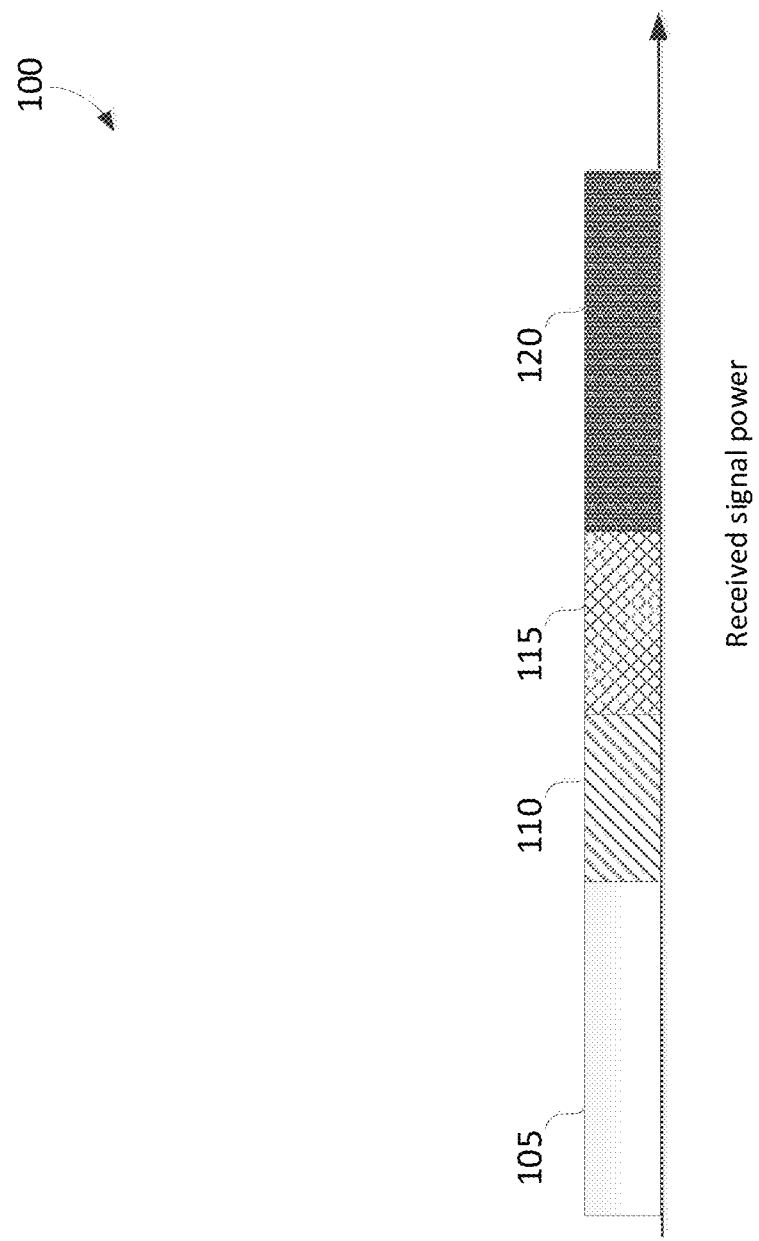
FIG. 1 is a diagram of various operating regions for a network device receiver as a function of the incoming RF signal power.

An example behavior plot 100 for a receiver is shown in FIG. 1 for various incoming RF signal power levels. In a linear region 105, the receiver components such as the LNA are working properly without excessive saturation or clipping so that the output signal from each receiver component has a linear relationship to the input signal to that receiver component. But as the incoming RF signal power is increased, the receiver behavior enters into a non-linear region 110. In non-linear region 110, the receiver components such as the LNA introduce non-linear interference components in their output signals. In non-linear region 110, the non-linearity is relatively mild such that linear behavior may be recovered such as through an LNA linearizer. But as the incoming RF signal power increases into an overly-saturated region 115, the receiver components such as the LNA are so saturated and disturbed that linear behavior cannot be recovered. Finally, as the incoming RF signal power increases to a harmful region 120, the receiver components such as the LNA may be permanently damaged, particularly if exposure to such a powerful incoming RF signal is lengthened or prolonged.

Given the proliferation of network devices in modern wireless communication systems, there are various scenarios in which a victim network device may be exposed to an excessively powerful incoming RF signal such as discussed for region 120 from an aggressor network device. The victim and aggressor network devices may each be any suitable network device such as a UE, a customer premises equipment (CPE), an IAB-MT, a DU, or a TRP. As discussed previously, the aggressor network device may be transmitting to another network device while being located relatively close to the victim network device so as to cause the excessive interference. Alternatively, the aggressor network device may be transmitting the incoming RF signal to the victim network device but not have the proper transmit (TX) power control. For example, the aggressor network device may be a repeater that is repeating a signal to the victim network device without proper TX power control. Alternatively, the aggressor network device may be a sidelink UE that is transmitting a sidelink signal to a victim UE without proper TX power control. Note that the excessive interference may be generated by the victim network device itself such as in a full-duplex mode of communication that results in self-interference.

Figure 2:
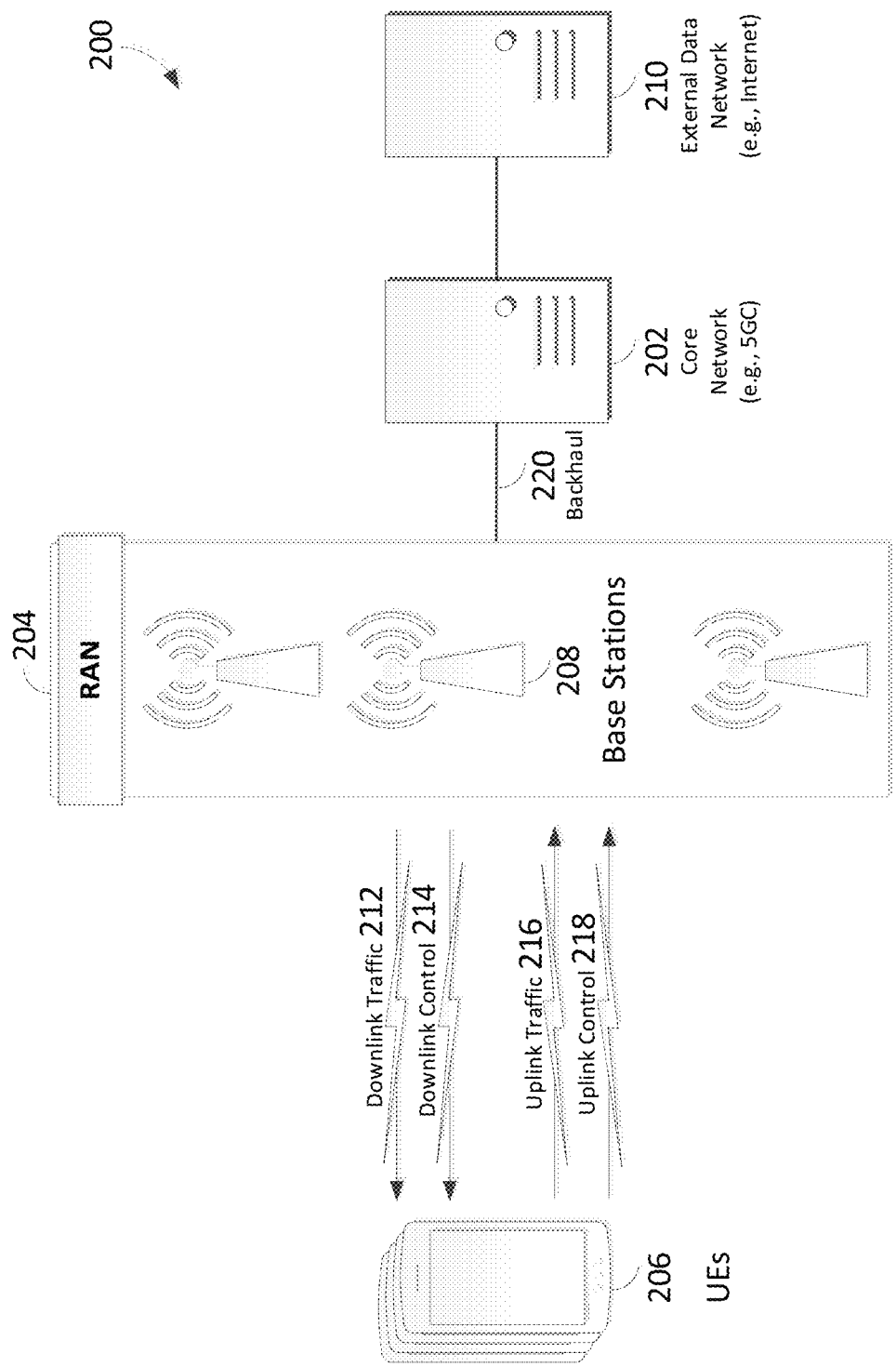
FIG. 2 is a schematic illustration of a wireless communication system with excessive interference mitigation in accordance with an aspect of the disclosure.

There are several techniques disclosed herein in which a victim network device may mitigate the potential non-linearity or damage caused by excessively strong incoming RF signals. Turning now to FIG. 2, various aspects of the present disclosure are illustrated with reference to a wireless communication system 200. The wireless communication system 200 includes three interacting domains: a core network 202, a radio access network (RAN) 204, and a plurality of user equipment (UE) 206. Each UE 206 is an example of a network device configured to mitigate the potential non-linearity or damage caused by excessively strong incoming RF signals. Some background features of wireless communication system 200 will first be discussed followed by a more detailed discussion of the excessive interference mitigation.

By virtue of the wireless communication system 200, each UE 206 may be enabled to carry out data communication with an external data network 210, such as (but not limited to) the Internet. The RAN 204 may implement any suitable wireless communication technology or technologies to provide radio access to each UE 206. As one example, the RAN 204 may operate according to 3rd Generation Partnership Project (3GPP) New Radio (NR) specifications, often referred to as 5G. As another example, the RAN 204 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 204 includes a plurality of base stations 208. Broadly, a base station is a network device in a radio access network responsible for radio transmission and reception in one or more cells to or from a UE 206. In different technologies, standards, or contexts, a base station 208 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 206 may be defined as an apparatus that provides a user with access to network services.

UEs 206 may include a number of components configured for wireless communication; such components can include antennas, antenna arrays, RF chains, amplifiers, one or more processors, etc. electrically coupled to each other. For example, some non-limiting examples of a mobile apparatus (mobile network device) include a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A network device may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A network device may additionally be a digital home or smart home device such as a home audio, video, and/or multimedia device, an appliance, a vending machine, intelligent lighting, a home security system, a smart meter, etc.

Wireless communication between RAN 204 and a UE 206 may be described as utilizing an air interface. Transmissions over the air interface from a base station 208 to one or more UEs 206 may be referred to as downlink (DL) transmission. In accordance with certain aspects of the present disclosure, the term downlink may refer to a point-to-multipoint transmission originating at a base station 208. Another way to describe this scheme may be to use the term broadcast channel multiplexing. Transmissions from a UE 206 to a base station 208 may be referred to as uplink (UL) transmissions. In accordance with further aspects of the present disclosure, the term uplink may refer to a point-to-point or a point-to-multi-point transmission originating at a UE 206.

A base station 208 may thus broadcast downlink traffic 212 to one or more UEs 206. Broadly, each base station 208 is a node or device responsible for scheduling traffic in a wireless communication network, including the downlink traffic 212 and, in some examples, uplink traffic 216 and uplink control information 218 from the one or more UEs 206. On the other hand, each UE 206 is a node or device that receives downlink control information 214, including but not limited to scheduling information (e.g., a grant), synchronization or timing information, or other control information from another entity in the wireless communication network such as the base station 208.

Base stations 208 may include a backhaul interface for communication with a backhaul portion 220 of the wireless communication system. The backhaul 220 may provide a link between a base station 208 and the core network 202. Further, in some examples, a backhaul network may provide interconnection between the respective base stations 208. Various types of backhaul interfaces may be employed, such as a direct physical connection, a virtual network, or the like using any suitable transport network.

The core network 202 may be a part of the wireless communication system 200 and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

In various implementations, the air interface in the radio access network 204 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 204 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at one time the channel is dedicated for transmissions in one direction, while at other times the channel is dedicated for transmissions in the other direction, where the direction may change very rapidly, e.g., several times per slot. With this background information in mind, aspects of the excessive interference mitigation disclosed herein will now be discussed in more detail.

Each UE 206 is an example of a network device configured to practice excessive interference mitigation. There at least three main implementations for the excessive interference mitigation. In a first implementation that is also denoted herein as a network-assisted excessive interference mitigation, a victim network device such as a UE 206 may be configured to transmit a notification to another network entity when excessive interference is detected. In response to the notification, the network entity may configure the victim network device and/or the aggressor network device to mitigate the excessive interference as discussed further herein. In a second implementation that is also denoted herein as a self-implemented excessive interference mitigation, a victim network device may be configured to detect a radio link failure (RLF) in response to detecting the excessive interference. The victim network device may then perform a mitigating action in lieu (or in addition to) transmitting a notification to the network of the excessive interference detection. For example, the mitigating action may be the victim network device switching to a different receive antenna beam and/or begin the acquisition of a new cell. In a third implementation that is also denoted herein as a user-interface-implemented excessive interference mitigation, the victim network device may alert a user through a user interface (e.g., a displayed warning message, a vibration, an alarm sound, and so on) of the excessive interference detection. The three main implementations may each be practiced alone or in combination with each other. These three main implementations will now be discussed in more detail, beginning with the network-assisted excessive interference mitigation.

Network-Assisted Excessive Interference Mitigation

In network-assisted excessive interference mitigation, the victim network device transmits a notification of an excessive interference detection to a network entity so that the network supporting the victim network device may configure the victim network device (and/or the aggressor network device) to mitigate the excessive interference. The network entity (which may also be denoted as a network device) receiving the notification may be a control node, a gNB, a network (NW) node, an operations administration and maintenance (OAM) node, a control entity, another UE, and so on. An incoming RF signal of excessive power triggers the victim network device to transmit the notification.

The excessive interference detection may be performed in a variety of fashions such through a detection that an LNA is driven into a compression or saturation region. In that regard, an LNA has a limit to the output signal power or amplitude the LNA can produce. As the incoming RF signal's power is increased, the LNA output signal will approach and eventually equal the LNA's output signal amplitude limit. At that point the LNA can provide no further gain. At this saturation point, the LNA output signal may be deemed to be compressed as it does not equal the desired gain times the incoming RF signal.

A network device may thus be configured to detect when the LNA compression/saturation reaches a threshold level (e.g., some value in dB), whereupon the network device transmits the excessive interference notification. To limit the effects of noise and transiently-high incoming RF signal power, the network device may apply a temporal threshold as well. For example, the network device may trigger the notification only when excessive interference is detected for a threshold period of time (e.g., a certain number of milliseconds). Alternatively, the threshold period of time may be defined by a certain number of slots or symbols as discussed further herein.

In another example of a temporal thresholding, the excessive interference is detected to occur a threshold number of times within a threshold period of time. As discussed previously, the threshold period of time may be defined as a certain number of milliseconds, slots, or symbols. In yet another example of temporal thresholding, the excessive interference occurs a certain percentage of the time within the threshold period of time.

Figure 3:
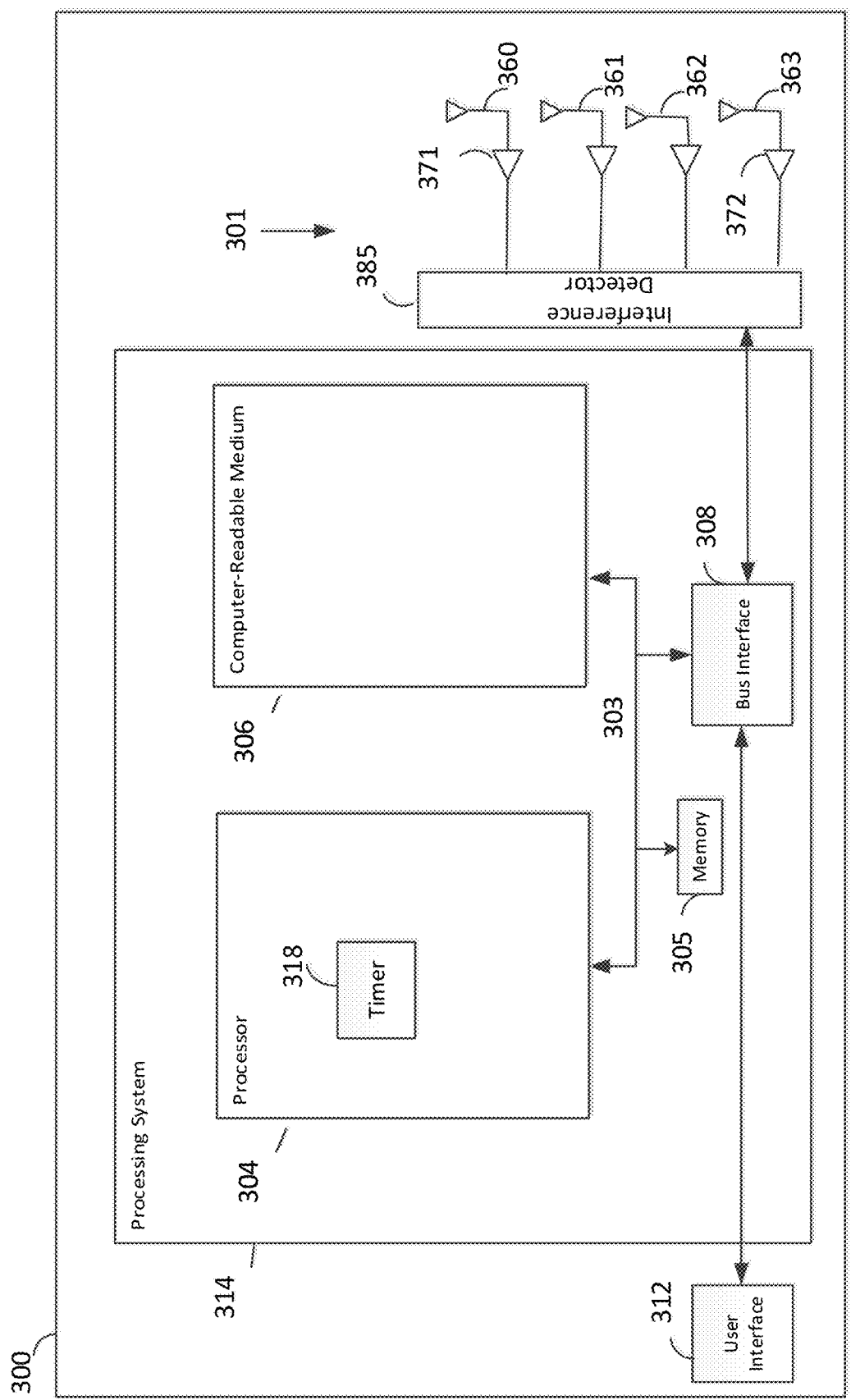
FIG. 3 illustrates an architecture for an excessive-interference-detecting network device in accordance with an aspect of the disclosure.

An example network device 300 configured to practice excessive interference mitigation as discussed herein is shown in FIG. 3. Network device 300 includes a receiver such as implemented in a transceiver 301 with at least one antenna. For example, transceiver 301 includes a first antenna 360, a second antenna 361, a third antenna 362, and a fourth antenna 363. Transceiver 301 may include an LNA for each antenna. For example, a received signal from the fourth antenna 363 is amplified by an LNA 372. Similarly, an LNA 371 amplifies a received signal from first antenna 360. In this fashion, each received signal is amplified by a corresponding LNA. Transceiver 301 may also include a phase-shifter (not illustrated) for each received signal so that the received signals can be phase-shifted individually as desired for beamforming and beamsteering applications. In this fashion, transceiver 301 may switch from one receive antenna beam to another receive antenna beam.

An interference detector 385 in transceiver 301 detects excessive interference caused by an excessively powerful incoming RF signal. In network device 300, interference detector 385 detects the excessive interference by monitoring the degree of saturation in the output signal from each LNA. However, it will be appreciated that excessive interference detection may be performed by interference detector 385 on other receiver components in transceiver 301.

Network device 300 includes a processing system 314 having a bus interface 308 that communicates with interference detector 385, a bus 303, a memory 305, a processor 304, and a computer-readable medium 306. Furthermore, network device 300 may include a user interface 312. Processor 304 is also responsible for managing the bus 303 and general processing, including the execution of software stored on the computer-readable medium 306. The software, when executed by the processor 304, causes the processor 304 to command transceiver 301 to transmit the notification to the network entity of the excessive interference detection. The computer-readable medium 306 and the memory 305 may also be used for storing data that is manipulated by the processor 304 when executing software.

The bus 303 may include any number of interconnecting buses and bridges depending on the specific application of the processing system 314 and the overall design constraints. The bus 303 communicatively couples together various circuits including one or more processors (represented generally by the processor 304), the memory 305, and computer-readable media (represented generally by the computer-readable medium 306). The bus 303 may also link various other circuits such as timing sources, peripherals, voltage regulators, and power management circuits, which are well known in the art, and therefore, will not be described any further. The bus interface 308 provides an interface between the bus 303 and transceiver 301.

As discussed previously, network device 300 may apply a temporal threshold to the excessive interference detection. For example, processor 304 may apply the temporal threshold to the excessive interference detection by interference detector 385. In turn, interference detector 385 may apply an amplitude threshold to the excessive interference. For example, interference detector 385 may be configured to detect excessive interference when the LNA compression exceeds a compression threshold by a threshold number of decibels.

Figure 4:
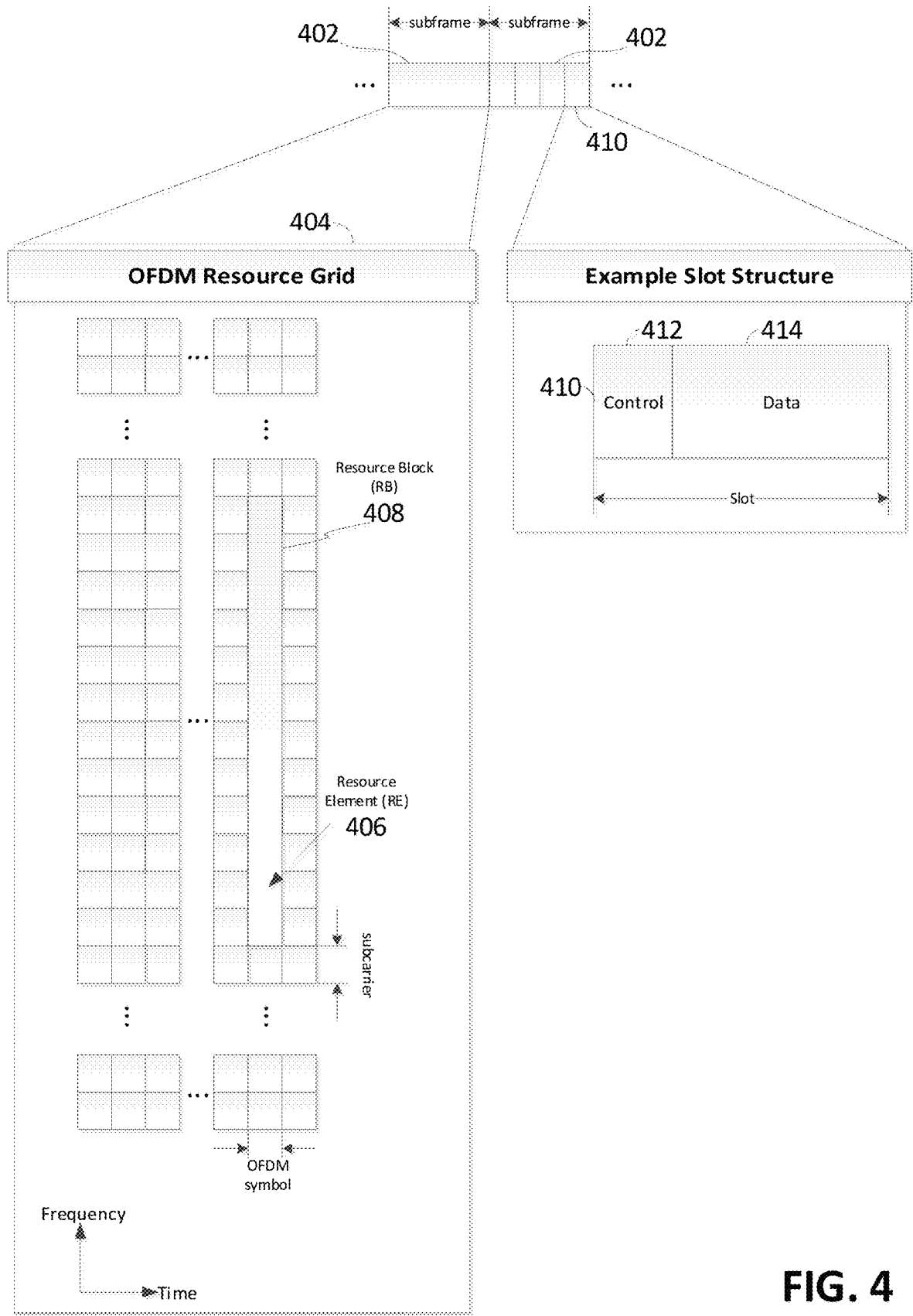
FIG. 4 is a schematic illustration of an organization of wireless resources utilizing orthogonal frequency divisional multiplexing (OFDM) for the wireless communication system of FIG. 2.

The temporal threshold may be the detection of excessive interference over a certain number of slots or symbols in the time-frequency resource grid for network device 300. The following discussion will assume that the time-frequency resource grid is defined with respect to an orthogonal frequency-division multiplexing (OFDM) waveform. An example resource grid 404 is illustrated in FIG. 4. In one implementation, a frame refers to a duration of 10 ms for wireless transmissions, with each frame consisting of 10 subframes of 1 ms each. On a given carrier, there may be one set of frames in the UL, and another set of frames in the DL. An expanded view of an exemplary DL subframe 402 is also shown in FIG. 4. However, as those skilled in the art will readily appreciate, the PHY transmission structure for any particular application may vary from the example described here, depending on any number of factors. In resource grid 404, time is in the horizontal direction with units of OFDM symbols and frequency is in the vertical direction with units of subcarriers or tones.

The resource grid 404 may be used to schematically represent time-frequency resources for a given antenna port. For example, in a MIMO implementation with multiple antenna ports, a corresponding multiple number of resource grids 404 may be available for communication on the various antenna ports. The resource grid 404 is divided into multiple resource elements (REs) 406. An RE 406, which is 1 subcarrier×1 symbol, is the smallest discrete part of the time-frequency grid, and contains a single complex value representing data from a physical channel or signal. A block of twelve consecutive subcarriers defined a resource block (RB) 408, which has an undefined time duration in the NR standard. In FIG. 4, resource block 408 extends over a symbol duration. A set of contiguous RBs 408 form a bandwidth part (BWP).

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of a slot 410 illustrates a control region 412 and a data region 414. In general, the control region 412 may carry control channels (e.g., the physical downlink control channel (PDCCH)), and the data region 414 may carry data channels (e.g., the physical downlink shared channel (PDSCH) or the physical uplink shared channel (PUSCH)). A slot 410 may contain all DL, all UL, or at least one DL portion and at least one UL portion. The structure illustrated in FIG. 4 is merely exemplary in nature, and different slot structures may be utilized, and may include one or more of each of the control region(s) and data region(s).

The various REs 406 within an RB 408 may be scheduled to carry one or more physical channels, including control channels, shared channels, data channels, etc. Other REs 406 within the RB 408 may also carry pilots or reference signals, including but not limited to a demodulation reference signal (DMRS), or cell specific reference signal (CRS). These pilots or reference signals may be used by a receiving device to perform channel estimation of the corresponding channel, which may enable coherent demodulation/detection of the control and/or data channels within the RB 408.

Referring again to network device 300, processor 304 may be configured to apply the temporal threshold as a threshold number of successive slots 410 over which interference detector 385 detects excessive interference. Alternatively, processor 304 may be configured to apply the temporal threshold as a threshold number of successive OFDM symbols over which interference detector 385 detects excessive interference. In yet another alternative, processor 304 may apply the temporal threshold as a threshold amount of time (e.g., milliseconds) over which interference detector detects excessive interference. In such a temporal threshold, the slots or symbols in which excessive interference is detected need not be consecutive. For example, the temporal threshold may instead be applied by processor 304 as a threshold percentage of excessive threshold detections within a period of time. In alternative implementations, interference detector 385 may apply the temporal threshold.

A network entity such as a base station 208 may configure network device 300 with the excessive interference threshold applied by interference detector 385 and any temporal threshold applied by processor 304. For example, the network entity may transmit a threshold configuration message to network device 300. Network device 300 may then proceed to configure itself with the excessive interference threshold responsive to the threshold configuration message. The network configuration of the threshold(s) applied by network device 300 responsive to the threshold configuration message may include identifying a set of time resources and/or a set of frequency resources to be searched by network device 300 for the excessive interference. The threshold configuration message may also be used by network device 300 to identify which receive antenna beams or receive antenna arrays are to be searched for the excessive interference.

The notification by network device 300 as transmitted by transceiver 301 to the network entity may be a 1-bit indication. Alternatively, the notification may include more information such as the power of the excessive interference. In that regard, interference detector 385 may include an RF power detector for measuring the power of the excessive interference. The notification may also include the amount and/or severity of the compression detected by interference detector 385. The notification may also include temporal information about the excessive interference such as its duration and related statistics. In addition, the notification may include an identification of the receive beam and/or the receive antenna array for which the excessive interference is detected.

The notification may use any suitable format. For example, the notification may be a layer 1 (L1) notification such as an uplink control information (UCI) message or sidelink control information, a layer 2 (L2) notification such as a medium access control (MAC) control element (MAC-CE) message, or a layer 3 (L3) notification such as a radio resource control (RRC) message. The notification may be sent over an F1 or Xn interface. In one implementation, network device 300 transmits the notification using a random access channel (RACH) message 1 (MSG1) that would be dedicated for the excessive interference mitigation. If the network device 300 does not have a grant to send a physical uplink control channel (PUCCH) or PUSCH message, the network device 300 may send a scheduling request (SR) prior to the transmitting the notification. The notification may be broadcast in a group common or in a dedicated manner to a particular network control entity. For example, should network device 300 be a sidelink UE, the sidelink UE may transmit the notification to peer UEs over the side-link channel. Note that the network device 300 may control the transmit power and beamsteering direction of the notification based upon the type of excessive interference and its severity as well as the transmit direction of the aggressor network device.

After sending the notification, network device 300 may monitor for a response from the network. This response may be a request for additional information from network device 300 or may just be an acknowledgement that the network entity has received the notification. In response to the notification, the network entity may configure network device 300 to change its frequency or time resources such as the time division duplex pattern, slot format indicator (SFI), beamforming configuration, and/or PDCCH monitoring occasions to mitigate the excessive interference. Should the aggressor network device be in the same wireless network, the network entity may respond to the notification by configuring the aggressor network device to change its time and frequency resources in a similar fashion to further mitigate the excessive interference. For example, the TDD configuration of the aggressor and victim network devices may be coordinated to reduce the excessive interference at the victim network device. In addition, the beamforming of the aggressor and network device may be coordinated to reduce the excessive interference at the victim network device. Even if the aggressor network device is in a different network and thus not under the control of the network entity, the network entity may find a better antenna beam for the victim network device, change its TDD pattern to avoid the transmissions from the aggressor network device, or properly duty cycle its communications with the victim network device to avoid long exposure to the excessive interference. The self-implemented excessive interference mitigation will now be discussed in more detail Self-Implemented Excessive Interference Mitigation Should a notification not result in sufficient excessive interference mitigation, network device 300 may institute a self-implemented excessive interference mitigation. For example, network device 300 may include a timer 318 such as implemented by processor 304. Timer 318 may begin timing a timer period upon the detection of the excessive interference or upon the transmission of the notification. Should network device 300 not receive a response or should the excessive interference not be mitigated before the expiration of the timer period, processor 304 may declare a radio link failure (RLF) and command transceiver 301 to change its receive antenna beam and/or begin the acquisition of a new cell. Note that network device 300 may be configured to perform self-implemented excessive interference mitigation in lieu of sending a notification to the network. As an alternative to timer 318, network device 300 may use a temporal threshold on the excessive interference detection by interference detector 385 to declare an RLF and institute the self-implemented excessive interference mitigation. The user-interface-implemented excessive interference mitigation will now be discussed in more detail.

User-Interface-Implemented Excessive Interference Mitigation

Network device 300 may use its user interface 312 to alert the user of the excessive interference detection. This alert may also be issued in response to receiving a message from another network device about possible excessive interference at network device 300. User interface 312 may present the alert to the user such through a display message, a vibration, or an alarm sound. Other types of alerts may also be used. The type and configuration of the alert to the user may be dependent on the level of the excessive interference, time of exposure, and severity level. The alert may provide additional information about the excessive interference such as accumulated exposure to the excessive interference, remaining time before transceiver damage, severity of the exposure, or the location of the aggressor network device. In addition, the alert may inform the user to move or rotate the device to mitigate the excessive interference.

Figure 5:
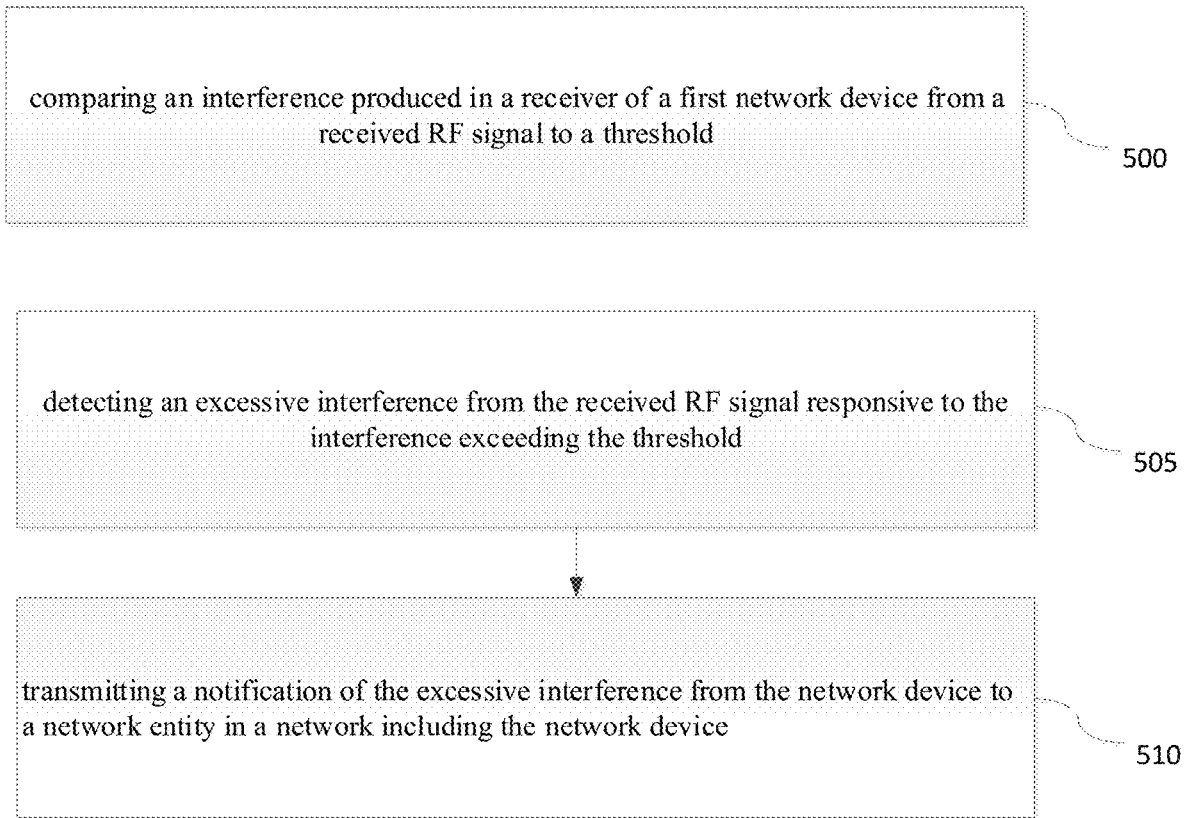
FIG. 5 is a flowchart for an example method of excessive interference mitigation in accordance with an aspect of the disclosure.

A method of excessive interference mitigation by a network device will now be discussed regarding the flowchart of FIG. 5. The method includes an act of 500 of comparing an interference produced in a receiver of a first network device from a received RF signal to a threshold and also an act 505 of detecting an excessive interference from the received RF signal responsive to the interference exceeding the threshold. The detection of the excessive interference by interference detector 385 in network device 300 is an example of acts 500 and 505. The method further includes an act 510 of transmitting a notification of the excessive interference from the network device to a network entity in a network including the network device. The transmission by one of UEs 206 to its base station 208 of the notification is an example of act 505.

The disclosure will now be summarized in a series of clauses:

Clause 1. A network device, comprising:
- a transceiver including an interference detector configured to detect an excessive interference from a received RF signal; and
- a processor configured to command the transceiver to transmit a notification of the excessive interference to a network entity in response to a detection by the interference detector of the excessive interference from the received RF signal.

Clause 2. The network device of clause 1, wherein the transceiver further includes a low-noise amplifier, and wherein the interference detector is further configured to detect that an output signal from the low-noise amplifier has a saturation greater than a threshold saturation level to detect the excessive interference from the received RF signal.

Clause 3. The network device of any of clauses 1-2, wherein the processor is further configured to transmit the notification of excessive interference to the network entity only when a temporal threshold is satisfied by the detection by the interference detector of the excessive interference from the received RF signal.

Clause 4. The network device of clause 3, wherein the temporal threshold comprises a threshold period over which the interference detector has the detection of the excessive interference from the received RF signal.

Clause 5. The network device of clause 4, wherein the threshold period comprises a threshold number of slots or a threshold number of symbols.

Clause 6. The network device of any of clauses 1-5, wherein the notification of excessive interference comprises a layer 1 message.

Clause 7. The network device of clause 6, wherein the layer 1 message comprises an uplink control information message or a sidelink control message.

Clause 8. The network device of any of clauses 1-5, wherein the notification of excessive interference comprises a layer 2 message.

Clause 9. The network device of clause 8, wherein the layer 2 message comprises a MAC-CE message.

Clause 10. The network device of any of clause 1-5, wherein the notification of excessive interference comprises a layer 3 message.

Clause 11. The network device of clause 10, wherein the layer 3 message comprises a radio resource control message.

Clause 12. The network device of clause 2, wherein the notification of excessive interference includes a level of the saturation.

Clause 13. The network device of any of clauses 1-5, wherein the notification of excessive interference includes an identity of a receive antenna beam or a receive antenna array for the received RF signal.

Clause 14. The network device of clause 4, wherein the notification of excessive interference includes the threshold period.

Clause 15. The network device of any of clauses 1-14, wherein the notification of excessive interference comprises a group broadcast or an individual broadcast to the network entity.

Clause 16. The network device of any of clauses 1-15, further comprising:
- a timer configured to time a timer period, wherein the processor is further configured to command the transceiver to change a receive antenna beam for receiving the received RF signal in response to an expiration of the timer period.

Clause 17. The network device of any of clauses 1-16, wherein the network device comprises a user equipment or a customer premises equipment.

Clause 18. The network device of any of clauses 1-17, further comprising:
- a user interface, wherein the processor is further configured to command the user interface to alert a user of the detection by the interference detector of the excessive interference from the received RF signal.

Clause 19. A network device, comprising:
- a transceiver including an interference detector configured to detect an excessive interference from a RF signal received over a first receive antenna beam; and
- a processor configured to command the transceiver to receive over a second receive antenna beam and/or declare a radio link failure responsive to a detection by the interference detector of the excessive interference from the RF signal received over the first receive antenna beam.

Clause 20. The network device of clause 19, wherein the processor includes a timer configured to time a timer period responsive to the detection of the excessive interference, and wherein the processor is further configured to command the transceiver to receive over the second receive antenna beam and/or declare the radio link failure only after an expiration of the timer period.

Clause 21. The network device of clause 19, wherein the processor is further configured to command the transceiver to acquire a new cell in response to the detection by the interference detector of the excessive interference from the RF signal.

Clause 22. A network device, comprising:
- a transceiver including an interference detector configured to detect excessive interference from a received RF signal;
- a user interface; and a processor configured to command the user interface to provide an alert of the detection by the interference detector of the excessive interference from the received RF signal.

Clause 23. The network device of clause 22, wherein the user interface comprises a display and wherein the alert comprises a message on the display.

Clause 24. The network device of clause 22, wherein the user interface comprises a speaker and wherein the alert comprises a message transmitted by the speaker.

Clause 25. The network device of clause 22, wherein the alert includes a command to move the network device.

Clause 26. A method, comprising:
  comparing an interference produced in a receiver of a first network device from a received RF signal to a threshold;
  detecting an excessive interference from the received RF signal responsive to the interference exceeding the threshold; and
  transmitting a notification of the excessive interference from the network device to a network entity in a network including the network device.

Clause 27. The method of clause 26, further comprising:
  receiving a threshold configuration message at the network device from the network; and
  configuring the network device with the threshold responsive to the threshold configuration message.

Clause 28. The method of clause 26, further comprising:
  identifying a set of time resources and/or a set of frequency resources at the network device responsive to the threshold configuration message, wherein comparing the interference produced in the receiver includes detecting the interference over the set of time resources and/or over the set of frequency resources.

Clause 29. The method of clause 26, further comprising:
  identifying a receive antenna beam and/or a receive antenna array at the network device responsive to the threshold configuration message, wherein comparing the interference produced in the receiver includes receiving the interference through the receive antenna beam and/or through the receive antenna array.

Clause 30. The method of any of clauses 26-29, wherein detecting the excessive interference from the received RF signal further comprises detecting the excessive interference from the received RF signal over a threshold period.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A network device, comprising:
  a transceiver configured to process a received RF signal from a network entity to generate an output signal, the transceiver including an interference detector configured to detect an excessive interference to the received RF signal, wherein the excessive interference causes the transceiver to be unable to maintain a linear relationship between the output signal and the received RF signal, and wherein the transceiver further includes a low-noise amplifier and wherein the interference detector is further configured to detect that an output signal from the low-noise amplifier has a saturation greater than a threshold saturation level to detect the excessive interference to the received RF signal.

2. The network device of claim 1, further comprising:
  a processor configured to command the transceiver to transmit a notification of the excessive interference to the network entity in response to a detection by the interference detector of the excessive interference to the received RF signal, wherein the processor is further configured to transmit the notification of excessive interference to the network entity when a temporal threshold is satisfied by the detection by the interference detector of the excessive interference to the received RF signal.

3. The network device of claim 2, wherein the temporal threshold comprises a threshold period over which the interference detector has the detection of the excessive interference to the received RF signal.

4. The network device of claim 3, wherein the threshold period comprises a threshold number of slots or a threshold number of symbols.

5. The network device of claim 2, wherein the notification of excessive interference comprises a layer 1 message.

6. The network device of claim 5, wherein the layer 1 message comprises an uplink control information message or a sidelink control message.

7. The network device of claim 2, wherein the notification of excessive interference comprises a layer 2 message.

8. The network device of claim 7, wherein the layer 2 message comprises a MAC-CE message.

9. The network device of claim 2, wherein the notification of excessive interference comprises a layer 3 message.

10. The network device of claim 9, wherein the layer 3 message comprises a radio resource control message.

11. The network device of claim 2, wherein the notification of excessive interference includes a level of the saturation.

12. The network device of claim 2, wherein the notification of excessive interference includes an identity of a receive antenna beam or a receive antenna array for the received RF signal.

13. The network device of claim 3, wherein the notification of excessive interference includes the threshold period.

14. The network device of claim 2, wherein the notification of excessive interference comprises a group broadcast or an individual broadcast to the network entity.

15. The network device of claim 2, further comprising:
  a timer configured to time a timer period responsive to the detection of the excessive interference, wherein the processor is further configured to command the transceiver to change a receive antenna beam for receiving the received RF signal in response to an expiration of the timer period.

16. The network device of claim 1, wherein the network device further comprises a user equipment or a customer premises equipment.

17. The network device of claim 2, further comprising:
  a user interface, wherein the processor is further configured to command the user interface to alert a user of the detection by the interference detector of the excessive interference from the received RF signal.

18. A method, comprising:
  receiving an RF signal at a transceiver of a network device to generate an output signal, wherein the RF signal is transmitted to the network device from a network entity in a network including the network device;

comparing an interference to the RF signal to a threshold; and detecting an excessive interference responsive to the interference exceeding the threshold, wherein the excessive interference causes the transceiver to be unable to maintain a linear relationship between the output signal and the RF signal,
  wherein the threshold is a saturation threshold, and wherein detecting the excessive interference comprises detecting that an output signal from a low-noise amplifier exceeds the saturation threshold.

19. The method of claim 18, further comprising:
receiving a threshold configuration message at the network device from the network; and
configuring the network device with the threshold responsive to the threshold configuration message.

20. The method of claim 19, further comprising:
identifying a set of time resources and/or a set of frequency resources at the network device responsive to the threshold configuration message, wherein comparing the interference includes detecting the interference over the set of time resources and/or over the set of frequency resources.

21. The method of claim 19, further comprising:
identifying a receive antenna beam and/or a receive antenna array at the network device responsive to the threshold configuration message, wherein comparing the interference includes receiving the interference through the receive antenna beam and/or through the receive antenna array.

22. The method of claim 18, wherein detecting the excessive interference further comprises detecting the excessive interference over a threshold period.

23. The method of claim 18, further comprising:
transmitting a notification of the excessive interference from the network device to the network entity, wherein transmitting the notification of the excessive interference comprises transmitting a layer 1 message.

24. The method of claim 23, wherein transmitting the layer 1 message comprises transmitting an uplink control information message or a sidelink control message.

25. The method of claim 18, further comprising:
transmitting a notification of the excessive interference from the network device to the network entity, wherein transmitting the notification of the excessive interference comprises transmitting a layer 2 message.

26. The method of claim 25, wherein transmitting the layer 2 message comprises transmitting a MAC-CE message.

27. The method of claim 18, further comprising:
transmitting a notification of the excessive interference from the network device to the network entity, wherein transmitting the notification of the excessive interference comprises transmitting a layer 3 message.

28. The method of claim 27, wherein transmitting the layer 3 message comprises transmitting a radio resource control message.

29. The network device of claim 1, further comprising:
a processor configured to command the transceiver to transmit a notification of the excessive interference to the network entity in response to a detection by the interference detector of the excessive interference to the received RF signal.

\* \* \* \* \*